US012587964B2

(12) United States Patent

Gucea et al.

(10) Patent No.: US 12,587,964 B2

(45) Date of Patent: Mar. 24, 2026

(54) REDUCING THE POWER CONSUMPTION OF END DEVICES IN WIRELESS MESH NETWORKS

(71) Applicant: NXP USA, INC., Austin, TX (US)

(72) Inventors: Doru Cristian Gucea, Bucharest (RO); Marius Preda, Bucharest (RO); George Stefan, Bucharest (RO)

(73) Assignee: NXP USA, Inc., Austin, TX (US)

( * ) Notice: Subject to any disclaimer, the term of this patent is extended or adjusted under 35 U.S.C. 154(b) by 674 days.

(21) Appl. No.: 17/819,022

(22) Filed: Aug. 11, 2022

(65) Prior Publication Data

US 2023/0328646 A1 Oct. 12, 2023

(30) Foreign Application Priority Data

Jun. 10, 2022 (RO) ............................... a 2022 00329

(51) Int. Cl.
*H04M 1/00* (2006.01)
*H04W 52/02* (2009.01)
*H04W 84/18* (2009.01)

(52) U.S. Cl.
CPC ........ *H04W 52/0222* (2013.01); *H04W 84/18* (2013.01)

(58) Field of Classification Search
CPC .. H04W 52/0209; H04W 84/18; H04W 52/02
See application file for complete search history.

(56) References Cited

U.S. PATENT DOCUMENTS

| | | | | | |
|---|---|---|---|---|---|
| 2008/0075005 A1* | 3/2008 | Kim | ..................... | H04W 28/06 |
| | | | | | 370/230 |
| 2016/0029380 A1* | 1/2016 | Wong | .................... | H04W 72/12 |
| | | | | | 370/336 |
| 2017/0310705 A1* | 10/2017 | Gopalakrishna | .... | H04L 41/0886 |
| 2021/0337473 A1* | 10/2021 | Hui | ......................... | H04W 4/00 |

FOREIGN PATENT DOCUMENTS

WO 2020050859 A1 3/2020

OTHER PUBLICATIONS

IEEE Computer Society, "IEEE Standard for High Data Rate Wireless Multi-Media Networks," IEEE Std 802.15.3™—2016, (Revision of IEEE Std 802.15.3-2003), 510 pages, publisher IEEE, New York, NY, USA. (uploaded in 3 parts due to file size).
J. Hui, et al., "Compression Format for IPV6 Datagrams over IEEE 802.15.4-Based Networks," DOI: 10.17487/RFC6282, Sep. 1, 2011, 24 pages, publisher Internet Engineering Task Force (IETF), Fremont, CA, USA.

* cited by examiner

*Primary Examiner* — Shantell L Heiber

(57) ABSTRACT

Systems and methods for reducing the power consumption of end devices in wireless mesh networks are described. In an illustrative, non-limiting embodiment, an end device may include: a controller; and a memory coupled to the controller, wherein the memory comprises program instructions stored thereon that, upon execution by the controller, cause the end device to transmit a frame to a parent device in a wireless mesh network, wherein the frame has a Frame Pending (FP) bit set to indicate, to the parent device, that the end device is ready to receive data from the parent device in the absence of a subsequent data request.

14 Claims, 5 Drawing Sheets

REDUCING THE POWER CONSUMPTION OF END DEVICES IN WIRELESS MESH NETWORKS

CROSS-REFERENCE TO RELATED APPLICATIONS

This application claims the priority under 35 U.S.C. § 119 to Romania patent application no. a 2022 00329, filed Apr. 10, 2022, the contents of which are incorporated by reference herein.

FIELD

This disclosure relates generally to wireless networking, and more specifically, to systems and methods for reducing the power consumption of end devices in wireless mesh networks.

BACKGROUND

In wireless mesh networks, end devices are often designed to operate for prolonged periods of time on battery power. To extend their battery life, end devices may be configured to go to sleep periodically (i.e., by entering a standby or low-power mode of operation). As a result, end devices are not in constant contact with the network to receive data packets.

Sleeping end devices may occasionally wake up and transmit data, such as sensor data, to a parent device. After receiving an acknowledgement from the parent device, the end device may then send a data request to determine if the parent device has data to send to the end device. Transmission of the data request and reception of a response from the parent device require the end device to stay awake, thus consuming battery power.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
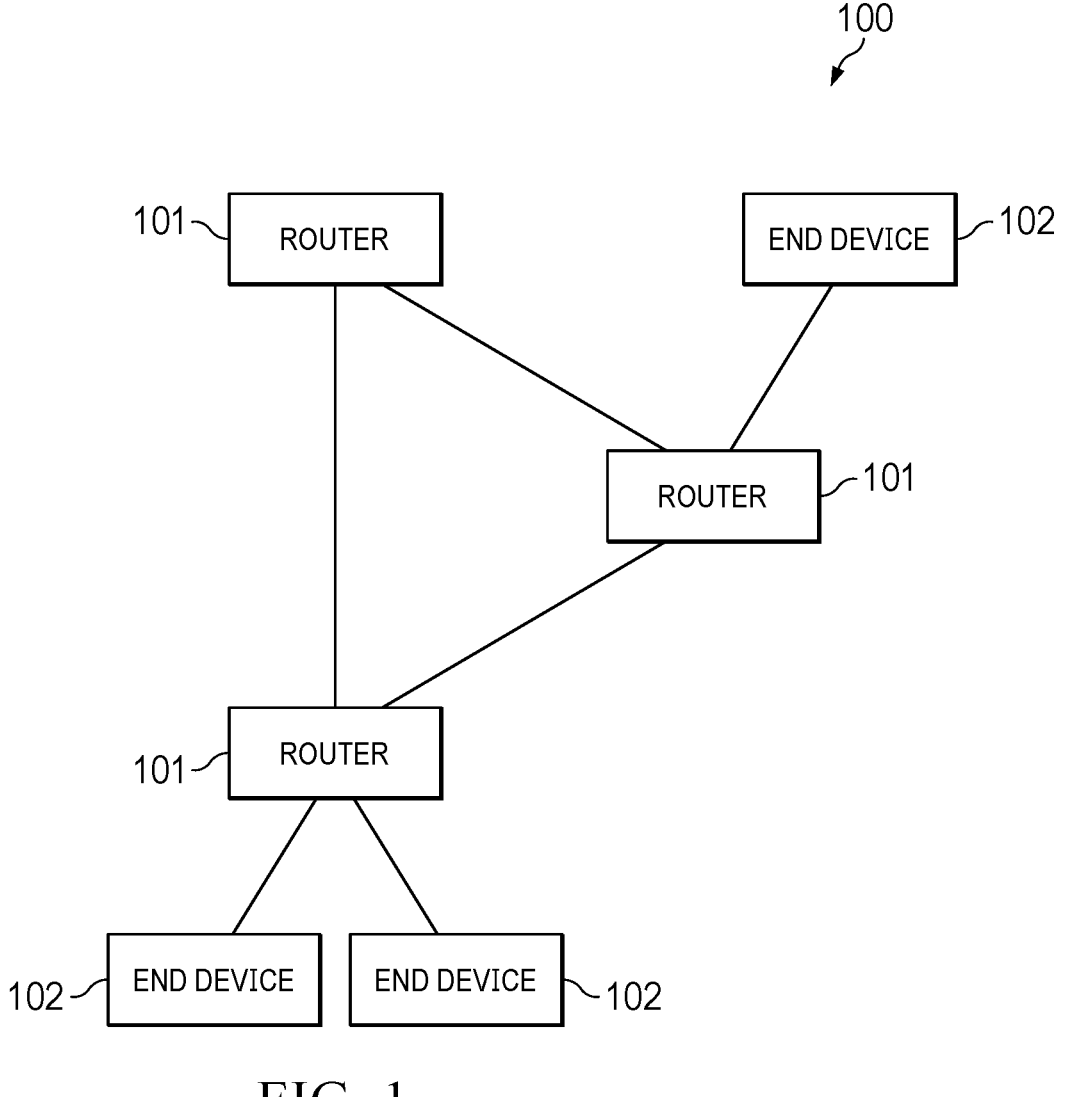
FIG. 1 illustrates an example of a wireless mesh network where various systems and methods described herein may be implemented, according to various embodiments.

Wireless mesh networks are communication networks having wireless nodes connected in a mesh topology that provide reliable and redundant communication paths for data traffic. Wireless mesh networks use multiple radio links, or hops, to forward data traffic between devices within the mesh network, thus providing coverage for areas larger than the area covered by a single radio link.

Wireless mesh networks may be implemented based on proprietary technologies, or standards-based technologies. For example, wireless mesh networks may be based on the Institute of Electrical and Electronics Engineers (IEEE) 802.15.4 standard, which defines physical (PHY) layer and Media Access Control (MAC) layer features and services for use by applications at upper layers of a mesh networking stack. Upper-layer applications rely on these standards-defined services to support addressing and routing of packet data that enable application-level communication across the mesh network, as well as between the mesh network and external networks (e.g., the Internet). Other wireless mesh network technologies, such as BLUETOOTH, THREAD, ZIGBEE, 6LoWPAN, Z-WAVE, and variations thereof have similar networking stacks.

End devices (also known as a "child devices") used in wireless mesh networks may be designed for low-power, battery operation over long periods of time, such as months or years. Examples of such end devices include, but are not limited to: thermostats, hazard detectors (e.g., smoke, carbon monoxide, water, etc.), cameras, lighting units, door locks, fans, appliances (e.g., refrigerators, stoves, ovens, washers, dryers, coffee makers, televisions, entertainment systems, sound systems, etc.), pool heaters, irrigation systems, security systems, intercoms, garage-door openers, control panels, etc.

To achieve long service life, a battery-powered end device may turn off many of its functions, such as radio and network interfaces. During its so-called "sleep" periods, end devices are not available on the mesh network to receive packets. Rather, an end device connects to a parent device (e.g., a hub, router, access point, computer, etc.), which is always active ("always on"), and acts on behalf of the end device when the latter is not awake. The parent device buffers packets destined for the end device and responds on behalf of the end device.

In conventional systems, when an end device transmits data to a parent device, it receives an acknowledgement from the parent device that does not include an indication of whether a data packet for the end device is buffered on the parent. The end device transmits a Data Request command or frame to the parent device to determine if there is a data packet buffered on the parent device and to request any buffered data. The parent device responds with the buffered data or an acknowledgement indicating whether there is buffered data pending to send to the end device.

More recently, acknowledgement (ACK) messages have been enhanced to include an indication of pending data for an end device. Particularly, a MAC entity in an end device may transmit a MAC Data frame in a message to a parent device, and a MAC entity in the parent device responds with an enhanced-ACK frame which includes a Frame Pending (FP) bit usable to indicate whether a data packet is pending for the end device.

After receiving an enhanced-ACK frame, if the FP bit indicates that there is no data pending for the end device, the end device can turn off its receiver and return to its sleep state (e.g., a low-power state or low-power mode). Conversely, if the FP bit indicates that there is data pending for the end device, the end device can retrieve the data from the parent device.

In a conventional system, even when the enhanced-ACK frame sent by the parent device indicates that a data packet is pending, the parent device must nonetheless wait until it receives an explicit Data Request command from an end device before it can send the pending data to the end device.

For example, assume that an end device wakes up only to check whether its parent has any data buffered for it. This may be achieved by sending a Data Request frame to the parent device, and the parent signals that it has buffered data for the end device by setting the FP bit in the ACK frame corresponding to the Data Request frame. Data then follows the ACK frame of the Data Request frame.

This approach, however, has at least two drawbacks: First, redundant information is present both in the ACK frame (FP=1) and in the subsequent Data frame (e.g., synchronization header, PHY header, and part of the MAC header). Second, the end device must stay awake, with its receiver on, while the parent device executes a carrier-sense multiple access with collision avoidance (CSMA/CA) algorithm before sending the data.

As another example, assume that an end device wakes up to send data to the parent device (e.g., a motion sensor that updates its parent). When the device wakes up, it can immediately send a Data frame to the parent device containing the data because, in a wireless mesh network, parent devices are always on. In its enhanced-ACK frame, the parent signals to the end device that it has data buffered for it, and the end device then explicitly requests it. The Data Request frame issued by the end device is an IEEE 802.11 MAC command frame generated at a specific polling interval.

A drawback of this approach is that the end device still needs to send a separate, explicit Data Request frame to the parent, despite it being ready to receive the data (because it remains in an awake or active state between the time the initial Data frame is sent and the time the enhanced-ACK frame is received).

To address these, and other concerns, systems and methods described herein may enable wireless mesh network end devices to reduce energy consumption and network traffic related to polling for buffered data, at least in part, by including data in an IEEE 802.15.4 acknowledgment in order to reduce or minimize the time an end device stays awake for a data exchange. These systems and methods include techniques for encapsulating data in an enhanced-ACK while ensuring that the data itself is acknowledged in a manner transparent to the upper network layers.

In addition, these systems and methods may assign new functionality to FP bits found in the MAC header of Data frames initiated by an end device to prevent the end device from sending superfluous messages (e.g., to let the parent known that the end device is ready to receive data). Mechanisms for backward compatibility are also described to enable nodes to communicate with conventional methods if one of them does not support the systems and methods described herein.

FIG. 1 illustrates an example of a wireless mesh network 100 in which various systems and methods described herein may be implemented. As shown, wireless mesh network 100 includes routers 101 (also known as a "parent devices") and end devices 102. Each of devices 101 and 102 includes a network interface for communication over wireless mesh network 100.

Particularly, routers 101 receive and transmit packet data over their respective mesh network interfaces and route traffic across wireless mesh network 100. End devices 102 can also communicate using wireless mesh network 100, but lack the capability, beyond simply forwarding packets to its parent router 101, to route traffic in wireless mesh network 100. In some cases, certain end devices 102 may be a "router-eligible" devices located at leaf nodes of the mesh network topology and can become parent devices if connected to other mesh network devices.

Some end devices 102 may power down certain operations or hardware for a portion of the time end device 102 is operational. For example, end device 102 may power down radios or network interfaces to conserve power between operations that require a connection to wireless mesh network 100. For example, a battery-powered temperature sensor may only be awake periodically to transmit a report of temperature, and then the sensor "sleeps" until the next time the temperature report. When an end device 102 sleeps, it is not actively connected to wireless mesh network 100 to respond to address queries or to receive data packets.

In various embodiments, wireless mesh network 100 may implement a standard specification such as, for example, IEEE 802.15.4, where enhanced-ACK frames allow an ACK frame to also carry a MAC data payload. Instead of sending two frames, one containing an ACK with the FP bit set, and another containing actual data, the IEEE 802.15.4 specification allows a parent device, such as routers 101, to embed a data payload within the MAC payload section of an enhanced-ACK frame.

However, enhanced-ACK frames do not ordinarily carry a sequence number for the encapsulated data—the sequence number in an enhanced-ACK contains the sequence number of the frame that is being acknowledged.

To address this, systems and methods described herein may allow end device 102 to acknowledge an enhanced-ACK transmitted by parent device 101 (containing encapsulated data) with another enhanced-ACK. The sequence number of the end device's enhanced-ACK may be the same as the sequence number of the parent's enhanced-ACK containing data. No ambiguity is created as parent device 101 extracts a frame from the indirect queue only when end device 102 explicitly requests it, and this frame is not re-transmitted. The turnaround time for end device 102 to transmit an enhanced-ACK is the same as for parent device 101.

When parent device 101 receives an IEEE 802.15.4 frame from end device 102 and detects that at least a part of buffered data can be encapsulated in a single enhanced-ACK frame, parent device 101 may associate the next available data sequence number with the data encapsulated in the enhanced-ACK frame, and it may keep that sequence number internally for later use in case the data encapsulated in the enhanced-ACK frame needs to be re-transmitted in a regular Data frame. The parent device may also associate a retransmission counter ("Retr_Counter") with the data encapsulated in the enhanced-ACK frame.

To maintain backward compatibility, end device 102 that supports an enhanced-ACK feature may first check whether its parent 101 also supports it. The check may be performed, for example, by including a Vendor Specific Header information element (IE), such as an organizationally unique identifier (OUI), in the first Data Request frame sent by end device 102. The Vendor OUI may be registered with the device manufacturer specifically as supporting these features. If parent device 101 echoes back the same Vendor Specific Header IE in its ACK frame, the check is deemed successful.

As such, in various embodiments described herein, data may be encapsulated in an enhanced-ACK and a backwardcompatible behavior may be maintained for the benefit of the layers above. Furthermore, the number of explicit Data Request frames sent by end device 102 may be reduced by attributing meaning to the FP bit field of frames initiated by it.

End device 102 may set an FP bit in a Data frame to announce to parent device 101 that it will keep its receiver on for receiving data if an enhanced-ACK transmitted by parent 101 has the FP bit set (i.e., FP=1), which obviates the need for an explicit Data Request command. If parent device 101 has no data buffered for end device 102, then the enhanced-ACK may have its FP bit unset (i.e., FP=0), and end device 102 may go to sleep immediately after receiving it. Conversely, if parent device 101 has data buffered for end device 102, then the enhanced-ACK frame may include that data, and end device 102 stays awake to receive it.

Furthermore, end device 102 may set the FP bit of an enhanced-ACK frame that acknowledges a parent's transmitted frame with the FP bit set. Again, by setting the FP bit, end device 102 announces to parent device 101 that it will keep its receiver on for receiving buffered data, and parent 101 may send subsequently data in a regular Data frame, in the absence of an explicit Data Request command.

Accordingly, using systems and methods described herein, the FP bit set in a frame transmitted by end device 102 may signify that end device 102 will stay awake for receiving data buffered by parent device 101. If the FP bit is not set in the frames transmitted by end device 102, then parent 101 refrains from sending buffered data.

Figure 2:
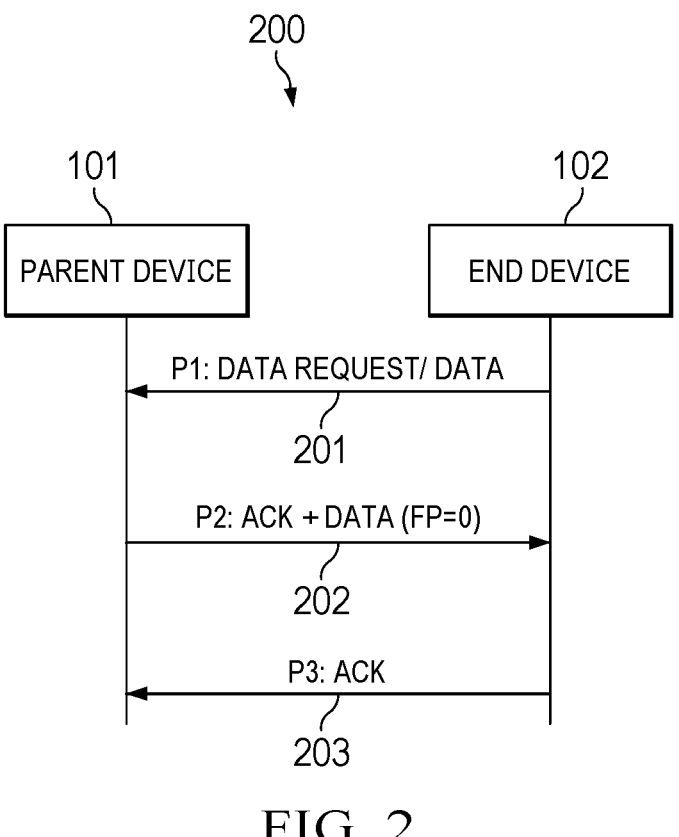
FIG. 2 illustrates an example of data and control transactions between an end device and a parent device, according to various embodiments.

To illustrate the foregoing, FIG. 2 shows a first example of data and control transactions 200 between end device 102 and parent device 101, according to various embodiments. At 201, end device 102 wakes up and sends a Data Request command or a Data frame (P1) to parent device 101 (e.g., a router). At 202, parent device 101 sends an enhanced-ACK frame (P2) to end device 102 with the FP bit unset (i.e., FP=0). At 203, end device 102 sends an ACK frame (P3) to parent device 101 and re-enters a sleep, standby, or low power mode.

In transactions 200, end device 102 receives an enhanced-ACK frame (P2) containing data and an FP bit unset. If no data has been lost and the FP bit of the enhanced-ACK frame is unset, this means that P2 is the last packet from parent device 101 and end device 102 can go to sleep. The sequence number field inside P2 acknowledges P1. The sequence number of P3 can safely be the same as P2's sequence number without producing ambiguities because P2 is the last frame buffered for end device 102. After this frame, end device 102 is expected to go to sleep and wake up later.

If P2 is lost, however, P1 may be re-transmitted, which in turn forces a re-transmission of P2 by parent device 101. Each re-transmission of the enhanced-ACK frame (P2) counts as an IEEE 802.15.4 re-transmission also for the data encapsulated in it (i.e., Retr_Counter is decremented after each re-transmission of P2). If the re-transmission count is reached (i.e., Retr_Counter=0) for the data encapsulated in P2, then a delivery failure event may be reported to upper network layers. Moreover, if P3 is lost and there are still retransmissions available for the data encapsulated in P2 (i.e., Retr_Counter >0), then parent device 101 generates a regular Data frame containing the data originally encapsulated in P2, and the sequence number of the Data frame is the previously saved sequence number.

In comparison with conventional methods, the method of FIG. 2 reduces the time end device 102 is awake by approximately 30% in cases where the MAC payload has 60 bytes and the air-medium is average busy (e.g., CSMA/CA is successful in the second iteration out of three).

Figure 3:
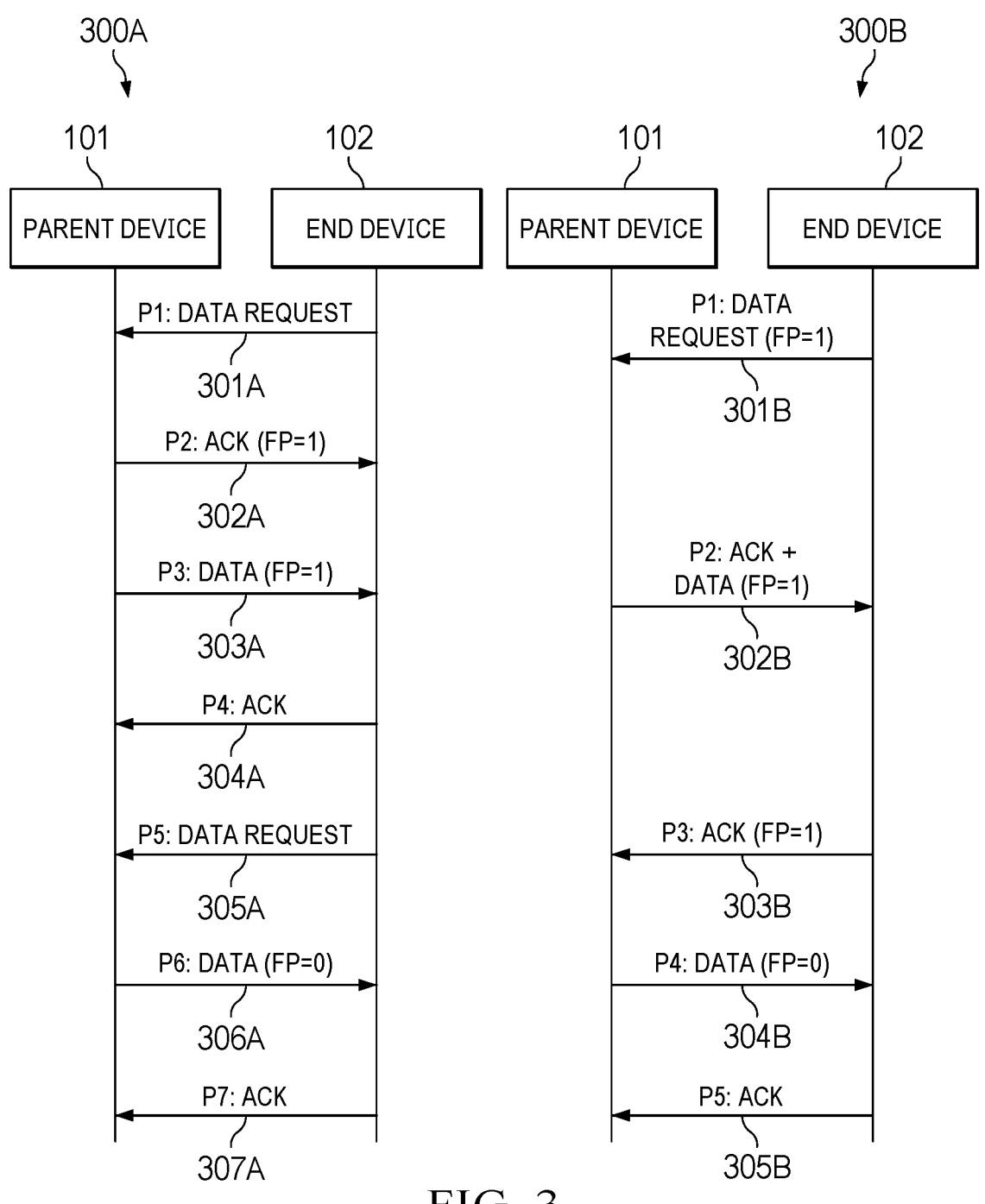
FIG. 3 illustrates an example use-case where an end device polls a parent device for buffered data using data and control transactions that enable the end device to enter a sleep state sooner, according to various embodiments.

FIG. 3 illustrates an example use-case 300B where end device 102 polls parent device 102 for buffered data using data and control transactions that enable end device 101 to enter a sleep state sooner than with conventional transactions 300A, according to various embodiments.

For sake of comparison, when implementing transactions 300A, end device 102 wakes up and sends a Data Request command (P1) to parent device 101 at 301A. At 302A, parent device 101 sends ACK frame (P2) to end device 102 with the FP bit set (i.e., FP=1). At 303A, parent device 101 sends a Data frame (P3) to end device 102, also with the FP bit set. At 304A, end device 102 sends its own ACK frame (P4) to parent device 101. At 305A, end device 101 sends another Data Request command (P5) to parent device 101. At 306A, parent device 101 sends Data frame (P6) to end device 102.

Finally, at 307A, end device 102 sends ACK frame (P7) to parent device 101 and re-enters a sleep, standby, or low power mode. In a typical use-case, the total time that end device 101 is awake when executing conventional transactions 300A is 22304 μs (i.e., 3664 μs*2 (P1, P6)+5712 μs*2 (P3, P7)+1184 μs*3 (P2, P4, P8)).

In contrast, when implementing transactions 300B using systems and methods described herein, end device 102 wakes up and sends a Data Request command (P1) to parent device 101 with the FP bit set (i.e., FP=1) at 301B. At 302B, parent device 101 sends enhanced-ACK frame (P2) to end device 102 with embedded data and with the FP bit set. In response, at 303B, end device 102 acknowledges P2 by sending an ACK frame (P3) to parent device 101 also with the FP bit set. At 304B, parent device 101 sends a Data frame (P4) to end device 102 with the FP bit unset (i.e., FP=0).

At 305B, end device 102 sends an ACK frame (P5) to parent device 101 and re-enters a sleep, standby, or low power mode. In this typical use-case, the total time that end device 101 is awake when executing transactions 300B is 15168 μs (i.e., 3664 μs (P1)+3424 μs (P2)+5712 μs (P4)+ 1184 μs*2 (P3, P5)), or approximately 32% less than conventional transactions 300A.

Figure 4:
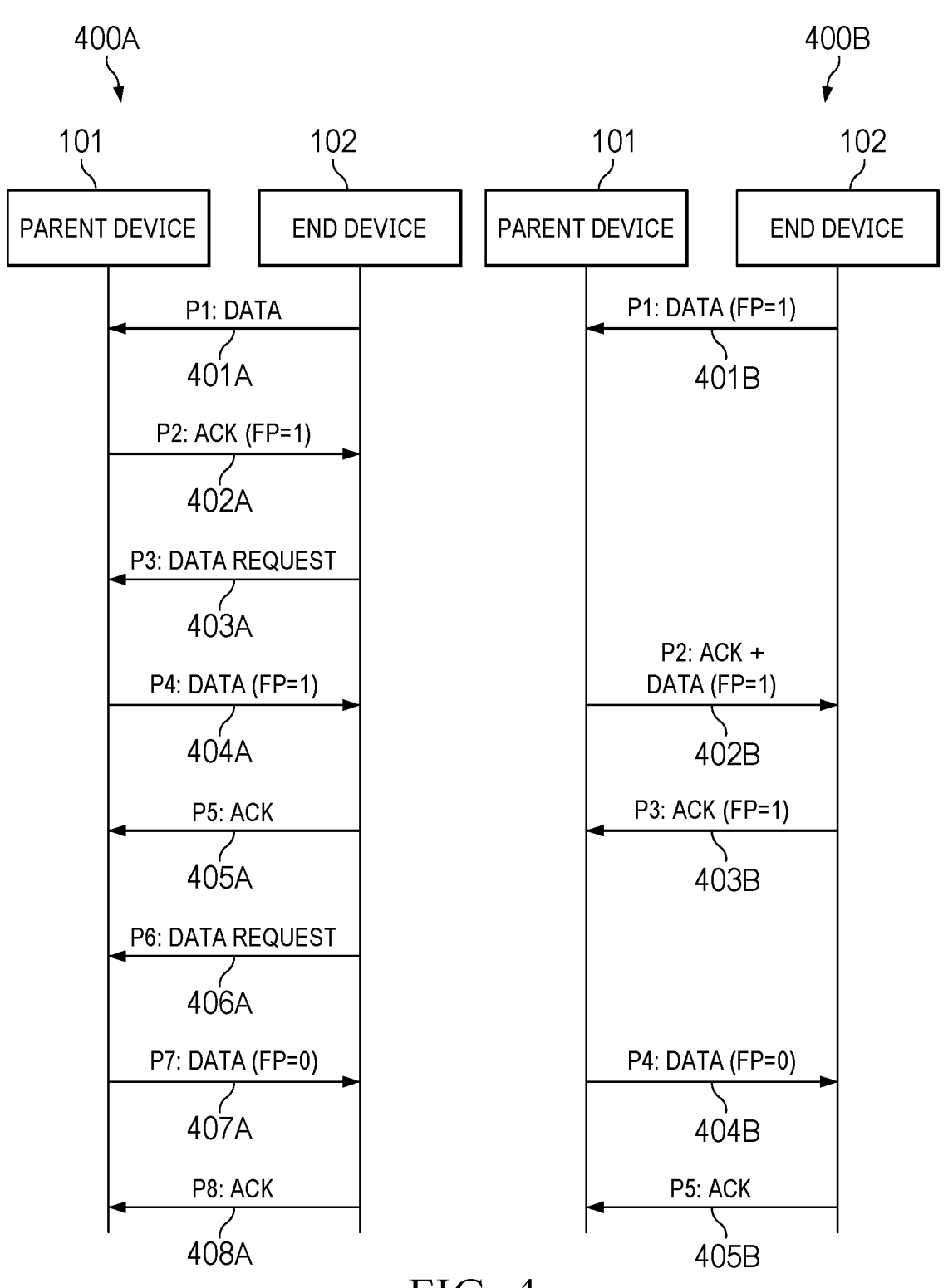
FIG. 4 illustrates another example use-case where an end device transmits data to a parent device and polls the parent device for buffered data using data and control transactions that enable the end device to enter a sleep state sooner, according to various embodiments.

FIG. 4 illustrates another example use-case 400B where end device 102 transmits data to parent device 101 and polls parent device 101 for buffered data using data and control transactions that enable end device 101 to enter a sleep state sooner than with conventional transactions 400A, according to various embodiments.

For sake of comparison, when implementing transactions 400A, end device 102 wakes up and sends a Data frame (P1) to parent device 101 at 401A. At 402A, parent device 101 sends ACK frame (P2) to end device 102 with the FP bit set (i.e., FP=1). At 403A, end device 101 sends a Data Request command (P3) to parent device 101. At 404A, parent device 101 sends a Data frame (P4) to end device 102 with the FP bit set. At 405A, end device 102 sends an ACK frame (P5) to parent device 101. At 406A, end device 101 sends another Data Request command (P6) to parent device 101. At 407A, parent device 101 sends Data frame (P7) to end device 102.

At 408A, end device 102 sends ACK frame (P8) to parent device 101 and re-enters a sleep, standby, or low power mode. In this typical use-case, the total time that end device 101 is awake when executing conventional transactions 400A is 28016 μs (i.e., 5712 μs*3 (P1, P4, P7)+1184 μs (P2, P5, P8)*3+3664 μs*2 (P3, P6)).

In contrast, when implementing transactions 400B using systems and methods described herein, end device 102 wakes up and sends a Data frame (P1) to parent device 101 with the FP bit set (i.e., FP=1) at 401B. At 402B, parent device 101 sends enhanced-ACK frame (P2) to end device 102 with embedded data, and with the FP bit set. In response, at 403B, end device 102 acknowledges P2 by sending an ACK frame (P3) to parent device 101 also with the FP bit set. At 404B, parent device 101 sends a Data frame (P4) to end device 102 with the FP bit unset (i.e., FP=0).

At 405B, end device 102 sends an ACK frame (P5) to parent device 101 and re-enters a sleep, standby, or low power mode. In a typical use-case, the total time that end device 101 is awake when executing transactions 400B is 17216 μs (i.e., 5712 μs*2 (P1, P4)+3424 μs (P2)+1184 μs (P3, P5)*2), or approximately 39% less than conventional transactions 400A.

As such, in various embodiments, systems and methods described herein provide mechanisms for acknowledging an enhanced-ACK frame, not specified by IEEE 802.15.4. In addition, these systems and methods add meaning to FP bit within frames initiated by end devices in a wireless mesh network. If an end device sets the FP bit in one the frames targeted to a parent device, then the parent device can keep sending buffered data without waiting for the end device to transmit an explicit Data Request command. The end device may remain in an active operating mode if a frame from the parent device with the FP bit set is received, thus extending the meaning of the FP bit in a way that reduces the power consumption of the end device.

Accordingly, systems and methods described herein reduce the power consumption of end devices in wireless mesh networks. In an illustrative, non-limiting embodiment, an end device may include: a controller; and a memory coupled to the controller, where the memory comprises program instructions stored thereon that, upon execution by the controller, cause the end device to transmit a frame to a parent device in a wireless mesh network, wherein the frame has a Frame Pending (FP) bit set to indicate, to the parent device, that the end device is ready to receive data from the parent device in the absence of a subsequent data request.

For example, the frame may include a data request. The program instructions, upon execution by the controller, may cause the end device to, prior to transmission of the data request, transmit an initial data request to the parent device, wherein the initial data request comprises a Vendor-Defined Header IE, and wherein an acknowledgment of the initial data request by the parent device comprises the Vendor-Defined Header IE.

Additionally, or alternatively, the frame may include an Institute of Electrical and Electronics Engineers (IEEE) 802.15.4 data frame. The program instructions, upon execution by the controller, may cause the end device to receive an enhanced-ACK frame from the parent device in response to the frame. The enhanced-ACK frame may have an FP bit unset, and the program instructions, upon execution by the controller, may cause the end device to enter a sleep mode in response to the enhanced-ACK frame. Conversely, the enhanced-ACK frame may have an FP bit set and data encapsulated in a MAC payload section. The program instructions, upon execution by the controller, may cause the end device to transmit an ACK frame to the parent device with an FP bit set to indicate, to the parent device, that the enhanced-ACK frame is acknowledged.

The program instructions, upon execution by the controller, further cause the end device to: receive a data frame from the parent device in response to the ACK frame, where the data frame has an FP bit unset; and enter a sleep mode in response to the data frame. Alternatively, the program instructions, upon execution by the controller, may also cause the end device to: receive a data frame from the parent device in response to the ACK frame, where the data frame has an FP bit set; and remain in an active mode in response to the data frame.

The enhanced-ACK frame may include a sequence number associated with the enhanced-ACK frame and lack a sequence number dedicated to the encapsulated data. A sequence number of the ACK frame may match the sequence number associated with the enhanced-ACK frame.

In another illustrative, non-limiting embodiment, a parent device may include: a controller, and a memory coupled to the controller, where the memory comprises program instructions stored thereon that, upon execution by the controller, cause the parent device to transmit an enhanced-ACK frame to an end device in a wireless mesh network, where the enhanced-ACK frame comprises data encapsulated in a MAC payload section and an FP bit set to indicate, to the end device, that the parent device is ready to transmit additional data to the end device before any data request from the end device subsequent to the enhanced-ACK frame is received by the parent device.

The program instructions, upon execution by the controller, may cause the parent device to keep the additional data from the end device in response to an ACK frame received from the end device, where the ACK frame has an FP bit unset. Alternatively, the program instructions, upon execution by the controller, may cause the parent device to transmit the additional data to the end device in response to an ACK frame received from the end device, where the ACK frame has an FP bit set.

The program instructions, upon execution by the controller, may further cause the parent device to: determine that there is no more data ready to transmit to the end device; and in response to the determination, transmit a data frame to the end device with an FP bit unset.

In yet another illustrative, non-limiting embodiment, a method may include: transmitting a first frame from an end device to a parent device in a wireless mesh network, wherein the first frame has an FP bit set; and maintaining the end device in an active state at least until a second frame is transmitted by the parent device to the end device with an FP bit unset. The second frame may include an enhanced-ACK frame comprising data encapsulated in a MAC payload section.

Figure 5:
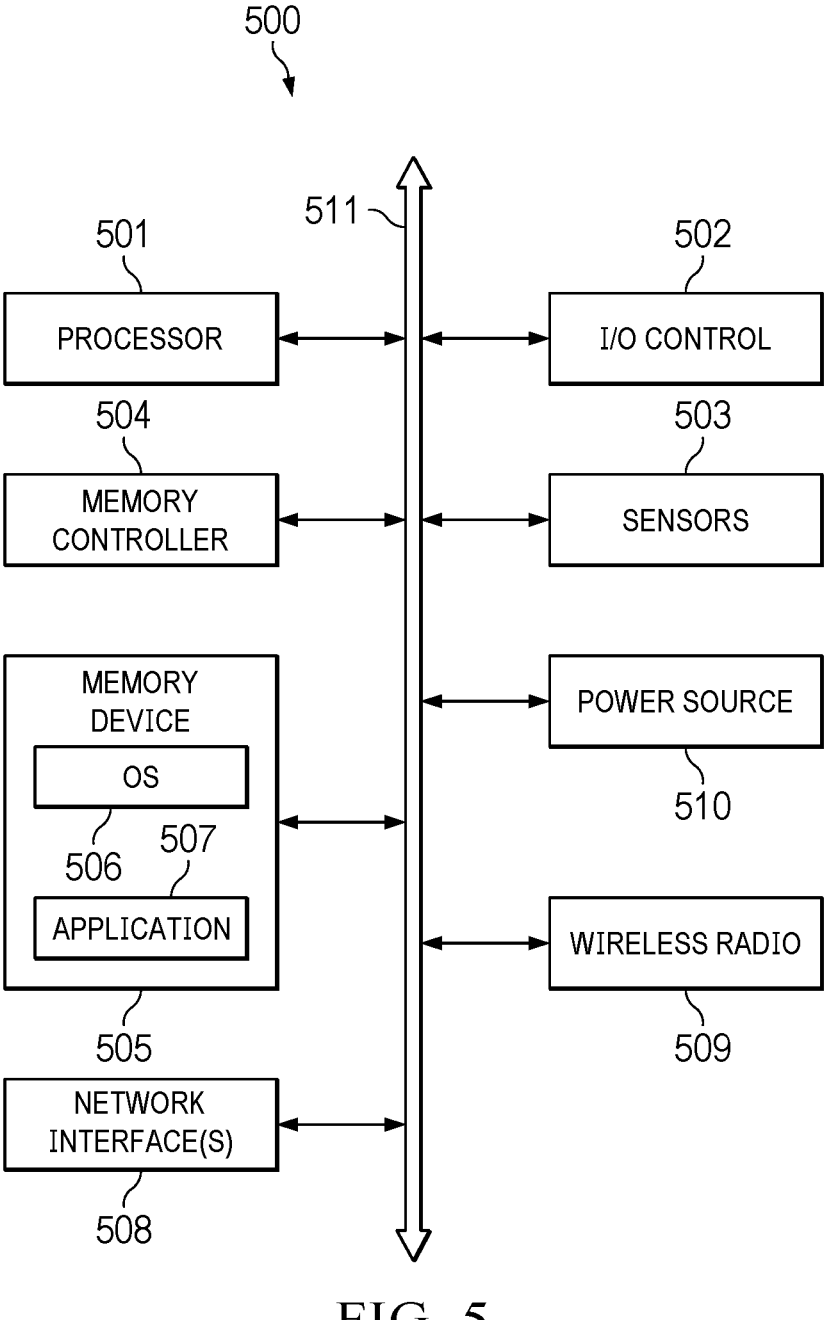
FIG. 5 illustrates an example of a wireless mesh network device that may be implemented as an end device or a parent device, according to various embodiments.

FIG. 5 illustrates an example of wireless mesh network device 500 that may be implemented as end device 102 or parent device 101. In various embodiments, device 500 may be integrated with electronic circuitry, microprocessors, memory, input output (I/O) logic control, communication interfaces and components, as well as other hardware, firmware, and/or software to implement end device 102 or parent device 101 in wireless mesh network 100.

Device 500 includes processor 501 (e.g., a controller, a microcontroller, a digital signal processor, etc.) configured to execute program instructions stored in memory device 505 for implementing various systems and methods described herein. Processor 501 may include components of an integrated circuit, programmable logic device, a logic device formed using one or more semiconductors, and other implementations in silicon and/or hardware, such as a processor and memory system implemented as a system-on-chip (SoC).

In some cases, processor 501 may include two units: (i) a low-power microprocessor, core, or domain, and (ii) a high-power microprocessor, core, or domain. The high-power microprocessor may execute computationally intensive operations, whereas the low-power microprocessor may manage simpler processes, such as detecting inputs from one or more sensors. The low-power processor may also wake or initialize the high-power processor for computationally intensive processes.

In device 500, data bus 511 couples its various components and enable data communication between those components. Data bus 511 may be implemented as any suitable combination of one or more bus structures and/or bus architectures. Device 500 also includes power source 510, such as a battery and/or an AC-DC power supply.

Sensors 503 may be implemented to detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio frequency (RF), other electromagnetic signals or fields, or the like. As such, sensors 503 may include any one or a combination of temperature sensors, humidity sensors, hazard-related sensors, other environmental sensors, accelerometers, microphones, optical sensors up to and including cameras (e.g., charged coupled-device or video cameras, active or passive radiation sensors, GPS receivers, and RF identification (ID) detectors).

Memory controller 504 and memory device 505 may implement any type of nonvolatile memory and/or other suitable electronic storage device. Device 500 may include various firmware and/or software, such as Operating System (OS) 506 maintained as computer executable instructions in memory 505 and executed by processor 501. Moreover, application 507 may include a routing application that implements various aspects of the systems and methods described herein.

Input-output (I/O) control 502 may be configured to receive input from a user and/or provide information to the user. For example, I/O control 502 may also include mechanical or virtual components that respond to a user input. For example, the user can mechanically move a sliding or rotatable component, or the motion along a touchpad may be detected, and may correspond to a setting of device 500.

Device 500 includes network interfaces 508, such as a mesh network interface for communication with other devices in a wireless mesh network, and an external network interface for network communication, such as via the Internet. Wireless radio system 509 may be used for wireless communication with other devices via network interface 508 and for multiple, different wireless communications systems. For instance, radio system 509 may include a radio device, antenna, and chipset implemented for any given wireless communications technology, such as, for example, Wi-Fi, BLUETOOTH, Mobile Broadband, BLE, point-to-point IEEE 802.15.4, etc.

In many implementations, systems and methods described herein may be incorporated into a wide range of electronic devices including, for example, computer systems or Information Technology (IT) products such as servers, desktops, laptops, memories, switches, routers, etc.; telecommunications hardware; consumer devices or appliances such as mobile phones, tablets, wearable devices, Internet-of-Things (IoT) devices, television sets, cameras, sound systems, etc.; scientific instrumentation; industrial robotics; medical or laboratory electronics such as imaging, diagnostic, or therapeutic equipment, etc.; transportation vehicles such as automobiles, buses, trucks, trains, watercraft, aircraft, etc.; military equipment, etc. More generally, these systems and methods may be incorporated into any device or system having one or more electronic parts or components.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An end device, comprising:
a controller; and
a memory coupled to the controller, wherein the memory comprises program instructions stored thereon that, upon execution by the controller, cause the end device to:
transmit a frame to a parent device in a wireless mesh network, wherein the frame has a Frame Pending (FP) bit set to indicate, to the parent device, that the end device is ready to receive data from the parent device in the absence of a subsequent data request; and
receive an enhanced-acknowledgment (ACK) frame from the parent device, wherein the enhanced-ACK frame is sent to the end device in response to parent device receiving the frame, and wherein the enhanced-ACK frame comprises data encapsulated in a Media Access Control (MAC) payload section and a second FP bit set to indicate, to the end device, that the parent device is ready to transmit additional data to the end device before any data request from the end device subsequent to the enhanced-ACK frame is received by the parent device.

2. The end device of claim 1, wherein the frame comprises a data request.

3. The end device of claim 2, wherein the program instructions, upon execution by the controller, further cause the end device to, prior to transmission of the data request, transmit an initial data request to the parent device, wherein the initial data request comprises a Vendor-Defined Header Information Element (IE), and wherein an acknowledgment of the initial data request by the parent device comprises the Vendor-Defined Header IE.

4. The end device of claim 1, wherein the frame comprises an Institute of Electrical and Electronics Engineers (IEEE) 802.15.4 data frame.

5. The end device of claim 1, wherein the program instructions, upon execution by the controller, further cause the end device to send a second frame to the parent device and to receive a second enhanced-acknowledgment (ACK) frame from the parent device in response to the second frame.

6. The end device of claim 5, wherein the second enhanced-ACK frame has an FP bit unset, and wherein the program instructions, upon execution by the controller, further cause the end device to enter a sleep mode in response to the enhanced-ACK frame.

7. The end device of claim 1, wherein the enhanced-ACK frame comprises a sequence number associated with the enhanced-ACK frame and lacks a sequence number dedicated to the data encapsulated in the MAC payload section.

8. A parent device, comprising:
a controller; and
a memory coupled to the controller, wherein the memory comprises program instructions stored thereon that, upon execution by the controller, cause the parent device to transmit an enhanced-acknowledgment (ACK) frame to an end device in a wireless mesh network in response to the parent device receiving, from the end device, a frame having a first Frame Pending (FP) bit set to indicate to the parent device that the end device is ready to receive data from the parent device, wherein the enhanced-ACK frame comprises data encapsulated in a Media Access Control (MAC) payload section and a second FP bit set to indicate, to the end device, that the parent device is ready to transmit additional data to the end device before any data request from the end device subsequent to the enhanced-ACK frame is received by the parent device.

9. The parent device of claim 8, wherein the enhanced-ACK frame comprises a sequence number associated with the enhanced-ACK frame and lacks a sequence number dedicated to the encapsulated data.

10. The parent device of claim 9, wherein the program instructions, upon execution by the controller, cause the parent device to keep the additional data from the end device in response to an ACK frame received from the end device, wherein the ACK frame has an FP bit unset.

11. The parent device of claim 9, wherein the program instructions, upon execution by the controller, cause the parent device to transmit the additional data to the end device in response to an ACK frame received from the end device, wherein the ACK frame has an FP bit set.

12. The parent device of claim 11, wherein a sequence number of the ACK frame matches the sequence number associated with the enhanced-ACK frame.

13. The parent device of claim 11, wherein the program instructions, upon execution by the controller, cause the parent device to:
determine that there is no more data ready to transmit to the end device; and
in response to the determination, transmit a data frame to the end device with an FP bit unset.

14. A method, comprising:
transmitting a first frame from an end device to a parent device in a wireless mesh network, wherein the first frame has a Frame Pending (FP) bit set;
in response to the first frame, transmitting an enhanced-acknowledgement (ACK) frame from the parent device to the end device, wherein the enhanced-ACK frame comprises data encapsulated in a Media Access Control (MAC) payload section and a second FP bit set to indicate, to the end device, that the parent device is ready to transmit additional data to the end device before any data request from the end device subsequent to the enhanced-ACK frame is received by the parent device; and
maintaining the end device in an active state at least until a second frame is transmitted by the parent device to the end device with an FP bit unset.

* * * * *